United States Patent [19]

Schuermann et al.

[11] Patent Number: 5,053,774
[45] Date of Patent: Oct. 1, 1991

[54] TRANSPONDER ARRANGEMENT

[75] Inventors: Josef H. Schuermann, Oberhummel; Guenter Heinecke, Langenbach; Rudolf Kremer, Wartenberg, all of Fed. Rep. of Germany

[73] Assignee: Texas Instruments Deutschland GmbH, Friesing, Fed. Rep. of Germany

[21] Appl. No.: 655,182

[22] Filed: Feb. 13, 1991

Related U.S. Application Data

[63] Continuation of Ser. No. 216,756, Jul. 8, 1988, abandoned.

[30] Foreign Application Priority Data

Jul. 31, 1987 [EP] European Pat. Off. ........ 87111110.0

[51] Int. Cl.$^5$ .............................................. G01S 13/80
[52] U.S. Cl. ......................................... 342/44; 342/51
[58] Field of Search ........................... 342/42, 44, 51; 340/572, 825.54; 307/219.1

[56] References Cited

U.S. PATENT DOCUMENTS

| | | | |
|---|---|---|---|
| 4,040,053 | 8/1977 | Olsson | 342/42 |
| 4,068,232 | 1/1978 | Meyers et al. | 342/44 |
| 4,114,151 | 9/1978 | Denne et al. | 342/44 |
| 4,213,129 | 7/1980 | Kennedy et al. | 342/51 |
| 4,364,043 | 12/1982 | Cole et al. | 340/825.54 |
| 4,388,524 | 6/1983 | Walton | 235/380 |
| 4,757,315 | 7/1988 | Lichtenberg et al. | 342/125 |

FOREIGN PATENT DOCUMENTS

| | | |
|---|---|---|
| 0101125 | 2/1984 | European Pat. Off. . |
| 0198642 | 10/1986 | European Pat. Off. . |
| 2077555 | 12/1981 | United Kingdom . |
| WO84/869 | 3/1984 | World Int. Prop. O. . |

OTHER PUBLICATIONS

Wen et al., "Single Frequency RF Powered ECG Telemetry System", IEEE Trans. Biomed Eng'g, vol. BME-26, No. 2, pp. 105-109, Feb. 1979.

Primary Examiner—John B. Sotomayor
Attorney, Agent, or Firm—James C. Kesterson; James T. Comfort; Melvin Sharp

[57] ABSTRACT

A transponder arrangement is described comprising an interrogation unit (10) which sends an RF interrogation pulse to at least one responder unit (12). The responder unit (12) then transmits back data stored therein in the form of a modulated RF carrier to the interrogation unit (10). In the responder unit (12) is an energy accumulator (136) which stores the energy contained in the RF interrogation pulse. The responder unit (12) further contains means (142, 148) which in dependence upon the termination of the reception of the RF interrogation pulse and the presence of a predetermined energy amount in the energy accumulator (126) initiate the excitation of an RF carrier wave generator (130, 132, 134) operating with the frequency contained in the RF interrogation pulse. Further means (158, 192) are provided which from the output signal of the RF carrier wave generator (130, 132, 134) generate a control signal which is utilized to maintain the RF carrier wave and to modulate the RF carrier to be sent back with the stored data.

21 Claims, 3 Drawing Sheets

TRANSPONDER ARRANGEMENT

This application is a continuation of application Ser. No. 07/216,756, filed 07/08/88 now abandoned.

BACKGROUND OF THE INVENTION

The invention relates to a transponder arrangement comprising an interrogation unit which transmits at least one RF interrogation pulse to a responder unit which thereupon sends data stored therein back to the interrogation unit in the form of a modulated RF carrier.

There is a great need for devices or apparatuses which make it possible to identify or detect as regards their presence at a predetermined location objects which are provided with such devices or apparatuses in contactless manner and over a certain distance. It is for example desirable to request contactless and over a certain distance identifications which are uniquely assigned to an object and which are stored in the device or apparatus so that for example it can be determined whether the object is at a predetermined location or not. An example is also the case in which physical parameters such as the temperature or the pressure are to be interrogated directly at or in the object without direct access to the object being possible. A device or apparatus of the type desired can for example be attached to an animal which can then always be identified at an interrogation point without direct contact. There is also a need for a device which when carried by a person permits access checking so that only persons whose responder unit carried by them returns on request certain identification data to the interrogation unit are allowed access to a specific area. In this case the safeguarding of the data transfer is a very essential factor in the production of such devices. A further example of a case in which such a device is needed is the computer-controlled industrial production in which without the intervention of operating personnel components are taken from a store, transported to a production location and there assembled to give a finished product. In this case a device is required which can be attached to the individual components so that the latter can be specifically detected in the spares store and taken from the latter.

In all these examples an transponder arrangement of the type outlined at the beginning is required. For universal usability of such an arrangement the interrogation or inquiry unit must be handy and compact so that it withstands rough treatment in practice. The responder unit must be very small so that it can readily be attached to the objects to be detected.

SUMMARY OF THE INVENTION

The invention is based on the problem of providing a transponder arrangement with the aid of which the aforementioned requirements can be fulfilled and with which the necessary responder device can be made very economically and very small so that it can be used for a great variety of purposes, in particular whenever very many objects are to be provided with the responder unit. The responder unit is to be constructed so that it has a very low energy requirement and does not need its own power source which after a certain time would have to be renewed.

This problem is solved in the transponder arrangement according to the invention in that in the responder unit an energy accumulator is provided which stores the energy contained in the RF interrogation pulse, that in the responder unit means are provided which in dependence upon the termination of the reception of the RF interrogation pulse and the presence of a predetermined energy amount in the energy accumulator triggers the excitation of an RF carrier wave generator operating with the frequency contained in the RF interrogation pulse, and that further means are provided which from the output signal of the RF carrier wave generator produce a control signal which is utilized to maintain the RF carrier wave and to modulate the RF carrier to be sent back with the stored data.

Advantageous further developments are characterized in the subsidiary claims.

The transponder arrangement according to the invention includes a responder unit which with high efficiency, i.e. high peak power and high data transfer rate, permits the return of the data stored therein to the interrogation device. According to a preferred embodiment of the invention to increase the transmission reliability the information can be transmitted by the responder device several times in succession and accordingly received by the interrogation device. The transfer time can be kept so short that interferences to the transfer from outside are not very probable. Because of the high transfer rate it is also possible to arrange the responder unit on very rapidly moving objects without any interference occurring due to the Doppler effect. When several objects provided with a responder unit are in the transmitting range of the interrogation unit with the transponder arrangement according to the invention firstly the nearest object can be detected and then the objects which are further remote addressed.

BRIEF DESCRIPTION OF THE DRAWINGS

The invention will be explained in detail with reference to an example of embodiment with the aid of the drawings, wherein.

DETAILED DESCRIPTION OF THE INVENTION

Figure 1:
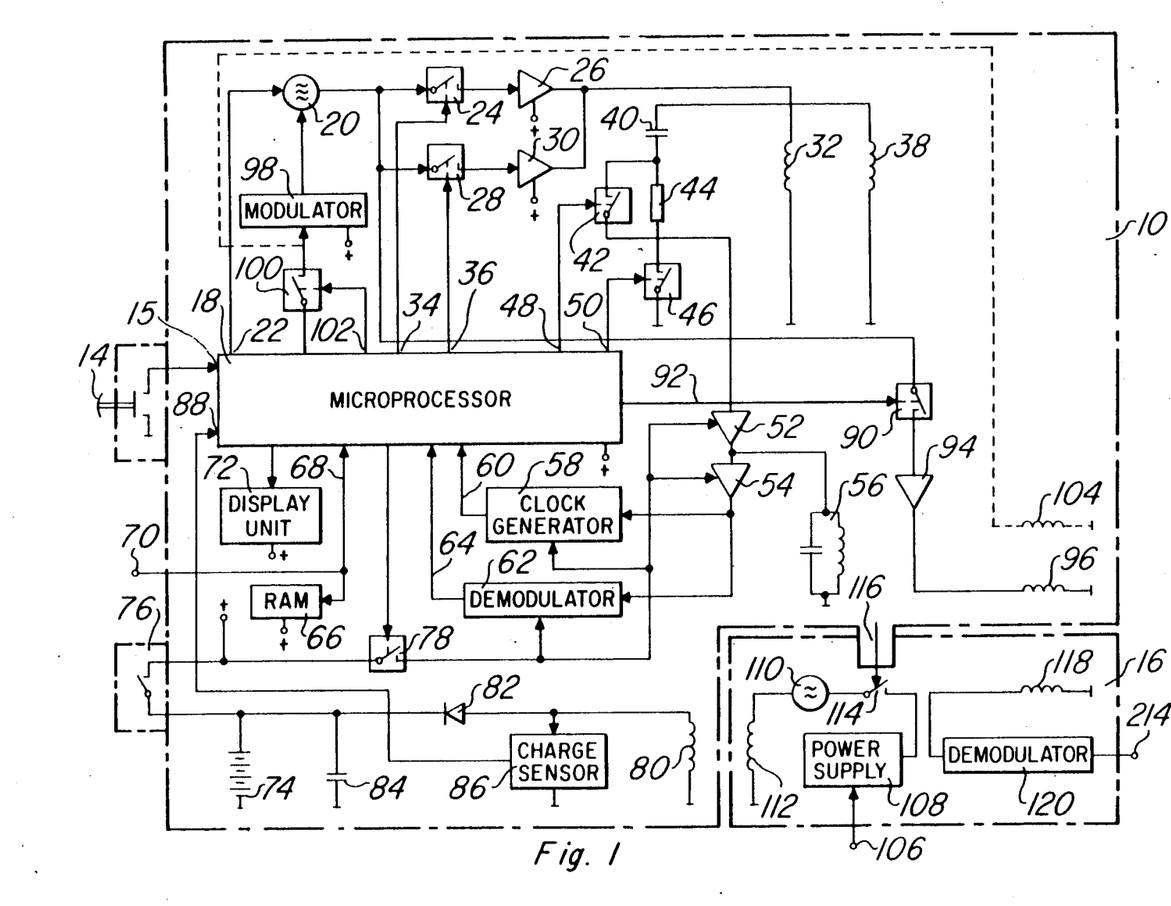
FIG. 1 is a block circuit diagram of the interrogation unit of the transponder arrangement according to the invention and of a base unit cooperating with said interrogation unit.
Figure 2:
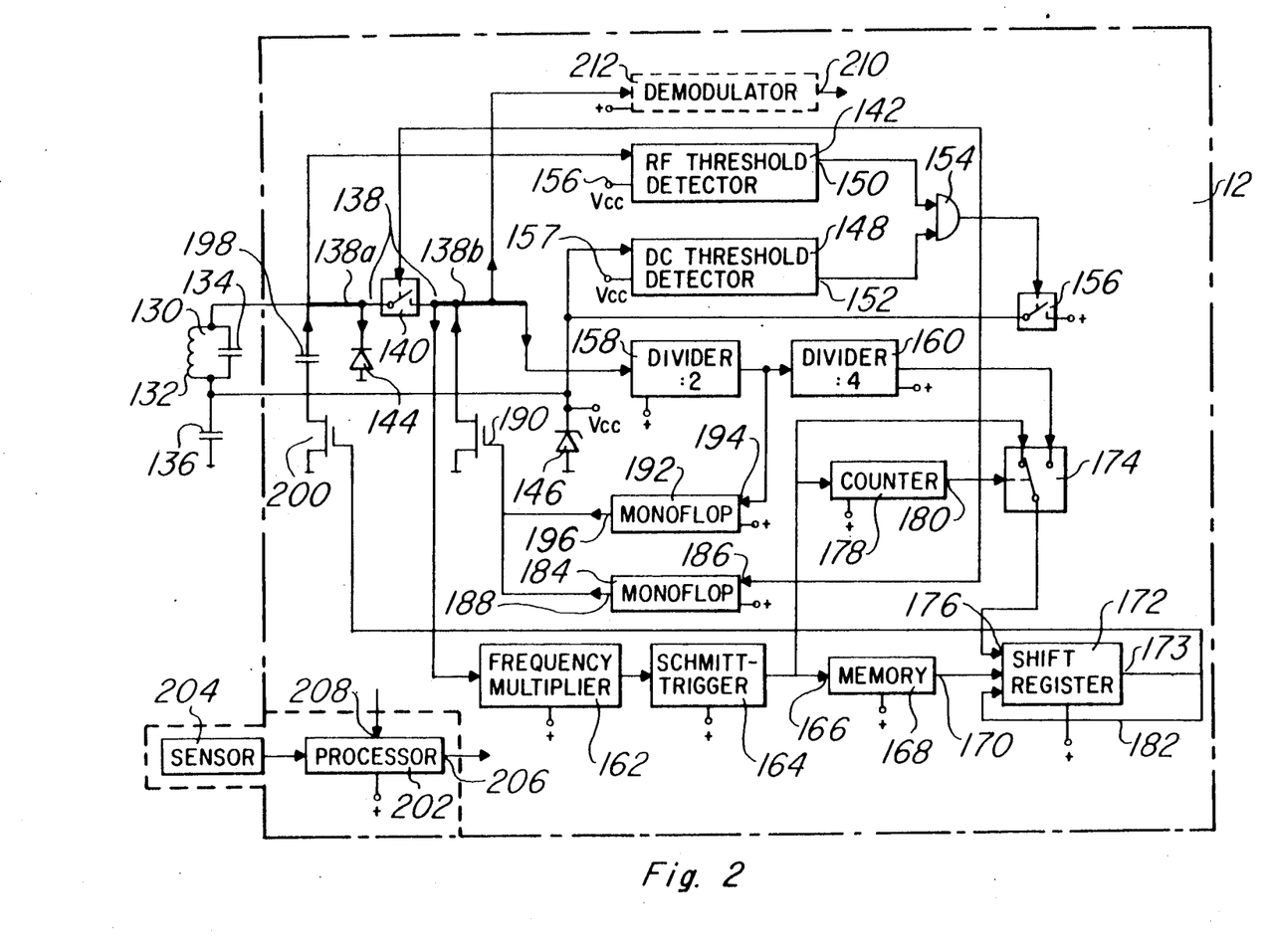
FIG. 2 is a block circuit diagram of the responder unit of the transponder arrangement according to the invention.

The transponder arrangement to be described includes an interrogation unit 10 and a responder unit 12. The interrogation unit 10 is a constructional unit to be held in the hand of an operator which transmits an RF interrogation pulse on actuation of a key 14. This interrogation unit 10 also has the capacity of receiving RF signals and detecting information contained in said signals. The RF signals come from the responder unit 12 which replies to the transmission of the RF interrogation pulse by sending back the RF signal. Associated with the interrogation unit 10 is a base unit 16 which is constructed as stationary unit. The functions of the interrogation unit 10, the responder unit 12 and base unit 16 and their interaction will be described in more detail hereinafter. Firstly, the makeup of these units will be explained.

The interrogation unit 10 contains as central control unit a microprocessor 18 which is responsible for the control of the function sequences. An RF oscillator 20 generates RF oscillations as soon as it has been set in operation by a signal at the output 22 of the microprocessor 18. The output signal of the RF oscillator 20 can be supplied either via a switch 24 and an amplifier 26 or via a switch 28 and an amplifier 30 to a coupling coil 32. The switches 24 and 28 are controlled by the microprocessor with the aid of signals emitted at its outputs 34 and 36 respectively. Coupled to the coupling coil 32 is a coil 38 of a resonant circuit which consists of the coil 38 and the capacitor 40. In series with the coil 38 and the capacitor 40 is a resistor 44 bridgeable by a switch 42 and a further switch 46 lies between the resistor 44 and ground. The switches 42 and 46 are controlled by the microprocessor which emits at its outputs 48 and 50 corresponding control signals. When the switch 46 is closed the resonant circuit comprising the coil 38 and capacitor 40 acts as parallel resonant circuit whilst when the switch 46 is open it acts as series resonant circuit. The coil 38 acts as transmitting and receiving coil which transmits the RF interrogation pulse supplied to it by the oscillator 20 and receives the RF signal sent back by the responder unit 12.

The RF signals received by the resonant circuit are supplied to two amplifiers 52, 54 which are so designed that they amplify the RF signals received and limit them for pulse shaping. Connected to the amplifiers is a parallel resonant circuit 56 which ensures the necessary reception selectivity. The output of the amplifier 54 is connected to a clock generator 58 which from the signal supplied thereto generates a clock signal and supplies the latter to the input 60 of the microprocessor 18.

In addition the output signal of the amplifier 54 is supplied to a demodulator which demodulates the signal applied thereto and supplies it to the input 64 of the microprocessor 18.

The information contained in the RF signal received is supplied after the demodulation in the demodulator 62 via the microprocessor 18 to a random access memory 66 so that it can be stored in the latter. Between the microprocessor 18 and the random access memory 66 a bidirectional connection 68 is disposed which makes it possible to enter information from the microprocessor 18 into the random access memory 66 and also to transfer information in the opposite direction. The information stored in the random access memory 66 can be taken off at a jack 70.

A display unit 72 fed by the microprocessor 18 makes it possible for the operator to detect the data contained in the RF signal received.

Since the interrogation unit 10 is a portable device as power supply a rechargeable battery 74 is provided. The output voltage of said battery 74 is supplied after closing a switch 76 to the terminals designated by "+" of selected chips in the interrogation unit 10. The supply voltage is however supplied to the two amplifiers 52, 54, the clock generator 58 and the demodulator 62 via a separate switch 78 which is controlled by the microprocessor 18. This makes it possible for said chips to be supplied with voltage and thus active only during a predetermined period of time within the total operating cycle.

The battery 74 can be charged by a voltage induced in a coil 80, rectified in a rectifier 82 and smoothed by means of a capacitor 84. A charge sensor 86 detects when a charge voltage is induced in the coil 80, i.e. a charging operation of the battery 74 is taking place. It then emits to the input 88 of the microprocessor 18 a corresponding message signal.

A further switch 90 controlled by means of a signal from the output 92 of the microprocessor 18 can in the closed state supply the output signals of the RF oscillator 20 via an amplifier 94 to a coupling coil 96.

With the aid of a modulator 98 the RF oscillator 20 can be modulated. The modulation signal necessary for this purpose is supplied to the modulator 98 by the microprocessor 18 via a switch 100 which is controlled by means of a signal from the output 102 of the microprocessor. The modulation signal from the microprocessor 18 is supplied when the switch 100 is closed also to a coupling coil 104 which is present only in a particular embodiment of the interrogation unit 10.

The base unit 16 also illustrated in FIG. 1 is a stationary unit which is connected via a jack 106 to the mains supply network. In a power supply 108 the operating voltage for a charging voltage generator 110 is generated, the output signal of which is supplied to a coil 112. Between the power supply 108 and the charge voltage generator 110 a switch 114 is inserted which is closed whenever the interrogation unit 10 is placed on the base unit 16. This is shown in FIG. 1 symbolically by a sort of actuating button 116 at the boundary line of the interrogation unit 10. The coils 112 and 80 are arranged in the base unit and interrogation unit 10 spatially in such a manner that they cooperate like the primary winding and secondary winding of a transformer when the interrogation unit 10 is placed on the base unit 16. In this manner the battery 74 can be charged contactless as often as required. The coils 94 and 104 in the interrogation unit 10 are so arranged that they are spatially very close to a coil 118 when the interrogation unit 10 is placed on the base unit 16. In this manner a contactless signal transmission between the coil 96 and the coil 104 on the one hand and the coil 118 on the other is possible. A demodulator 120 serves to demodulate the signals coming from the coil 118.

The responder unit 12 illustrated in FIG. 2 contains for reception of the RF interrogation pulse a parallel resonant circuit 130 having a coil 132 and a capacitor 134. Connected to the parallel resonant circuit 130 is a capacitor 136 serving as energy accumulator. In addition the parallel resonant circuit 130 is connected to an RF bus 138 consisting of two portions 138a and 138b connectable by means of a switch 140. Connected to said RF bus 138 are all the essential components of the responder unit 12. An RF threshold detector 142 connected to the portion 138b of the RF bus 138 has the function of monitoring the level of an RF carrier at the RF bus 138. Such an RF carrier occurs at the RF bus 138 whenever the parallel resonant circuit 130 receives an RF interrogation pulse from the interrogation unit 10. The RF threshold detector 142 emits at its output a signal of predetermined value as soon as the level of the RF carrier at the RF bus 138 drops below a predetermined threshold value. By connecting a diode 144 to the RF bus 138 the RF carrier is rectified and as a result the capacitor 136 is charged. The energy stored in said capacitor 136 is proportional to the energy contained in the RF interrogation pulse. Thus, after reception of the RF interrogation pulse a DC voltage can be taken off at the capacitor 136. A Zener diode 146 connected to the capacitor 136 ensures that the DC voltage which can be tapped off does not exceed a value defined by the Zener voltage of said diode. With the aid of the DC voltage threshold detector 148 the DC voltage value at the capacitor 136 is monitored and said threshold detector 148 emits an output signal of predetermined value as soon as a predetermined DC voltage value is present at the capacitor 136. The output 150 of the RF threshold detector 142 and the output 152 of the DC voltage threshold detector 148 are connected to the inputs of an AND circuit 154 which emits a start signal of predetermined value whenever the two threshold detectors 142 and 152 each emit the signal with the predetermined value.

The two threshold detectors 142 and 152 receive at the terminals 156 and 157 designated by $V_{cc}$ a supply voltage which is equal to the voltage at the capacitor 136. This voltage increases with the reception of the RF interrogation pulse from zero up to the value defined by the Zener voltage of the Zener diode 146, the two threshold detectors 142 and 152 being so constructed that they operate even at a supply voltage which is smaller than the voltage at the capacitor 136 defined by the Zener voltage of the Zener diode 46. Also connected to the capacitor 136 is a switch 156 which is controlled by the output signal of the AND circuit 154. This switch is inserted between the terminals designated by "+" of the remaining components of the responder unit 12 and the capacitor 136. It is ensured in this manner that the remaining components do not obtain their supply voltage until the voltage at the capacitor 136 has reached a value necessary for satisfactory operation of said components.

As apparent from the illustration of FIG. 2 the switch 140 is also controlled by the output signal of the AND circuit 154. This means that the portion 138b of the RF bus 138 is connected to the portion 138a as soon as the AND circuit 154 emits the start signal.

Connected to the portion 138b of the RF bus 138 is a divider 158 which divides the frequency of the RF signal at the RF bus 138 by two. A further divider 160 connected to the output of the divider 158 effects another frequency division by four so that at the output of said divider 160 a signal frequency is present corresponding to one eighth of the frequency at the RF bus 138.

Also connected to the portion 138b of the RF bus 138 is a frequency multiplier 162 which effects a doubling of the frequency of the RF signal at the RF bus. The output signal of the frequency multiplier 162 is shaped in a Schmitt trigger 164 whose output signal consists of pulses whose recurrence frequency is equal to twice the frequency of the RF signal at the RF bus 138. The output of the Schmitt trigger 164 is connected to the clock input 166 of a memory 168 constructed as read-only memory which can pass the information stored therein under the control of the pulses supplied to its clock input 166 to a shift register 172 connected to its data output 170. Depending on the position of a changeover switch 174 the shift register 172 is clocked via its clock input 176 with the pulses also supplied to the memory 168 or with the pulses furnished by the divider 160. The control of the changeover switch 174 is by means of a counter 178 which counts the pulses supplied to the memory 168 and at its output 180 emits a changeover signal for the switch 174 as soon as a predetermined count is reached. The shift register 172 is constructed so that the information supplied thereto circulates for as long as clock pulses are supplied to its clock input 156. This circulation operation is made possible by the feedback line 182.

The responder unit 12 further contains a monoflop 184 whose trigger input is connected to the output of the AND circuit 154. As soon as the AND circuit 154 emits the start signal the monoflop 184 is triggered so that for the duration of its holding time it furnishes at its output 188 an excitation pulse. Said excitation pulse renders the field-effect transistor 190 conductive and the latter applies the RF bus 138 to ground for the duration of the excitation pulse. A further monoflop 192 is connected with its trigger input 198 to the output of the divider 158. As soon as an output signal occurs at the output of the divider 158 the monoflop 192 is triggered so that for the duration of its hold time it furnishes at its output 196 a maintenance pulse which like the energization pulse at the output 188 of the monoflop 184 switches through the field-effect transistor 190. For reasons still to be explained below the hold time of the monoflop 192 is set substantially shorter than the hold time of the monoflop 184.

Connected to the portion 138a of the RF bus 138 is a capacitor 198 which by a field-effect transistor 200 acting as switch can be operatively connected to the parallel resonant circuit 130.

If required, in the responder unit 12 a processor 202 may also be contained, the purpose of which will be explained below. Said processor 202 can receive input signals from a sensor 204 which responds to physical parameters in the environment of the responder unit 12, for example to the ambient temperature, the ambient pressure or the like. The processor 202 comprises an output 206 at which it can furnish data which represent parameters determined by the SO sensor 204. The processor 202 can receive at an input 208 signals from the output 210 of a demodulator 212, likewise only optionally present. The purpose of this demodulator will also be explained in detail hereinafter.

Now that the makeup of the components of the transponder arrangement has been described, the processes taking place in the operating state of the arrangement will be explained.

Figure 3:
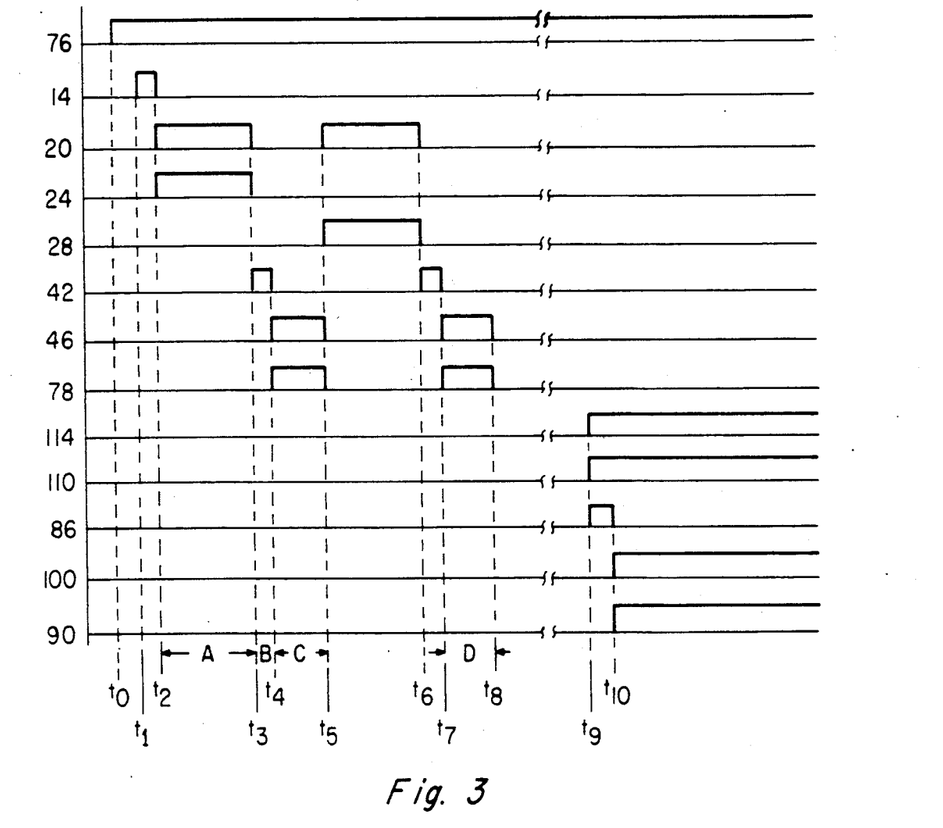
FIG. 3 is a time diagram to explain the time relationships between the individual processes in the cooperation between the interrogation unit, the responder unit and the base unit.

It is assumed that responder units 12 as illustrated in FIG. 2 are attached to a relatively large number of objects and that the responder units 12 are to be individually addressed and interrogated using the interrogation unit 10. Reference is made here to FIG. 3 in which it is indicated which assemblies are active during which time periods and play a part within an operating cycle. The numbers given on the left are the reference numerals of the particular assemblies concerned whilst the active time periods are shown respectively along the horizontal lines.

For performing an interrogation operation the operator removes the interrogation unit 10 from the base unit 16 and at an instant $t_0$ closes the switch 76. As a result to selected assemblies within the unit the voltage present at the battery 74 is applied as supply voltage. To initiate an interrogation operation the operator briefly depresses the key 14 (instant $t_1$) so that the input 15 of the microprocessor 18 is applied to ground for the duration of the depression of the key 14. This causes the microprocessor 18 by means of a signal at the output 22 to set the RF oscillator 20 in operation (instant $t_2$). At the same time, by means of a signal at the output 34 the microprocessor 18 closes the switch 24 so that during the time period A the carrier wave generated by the RF generator 20 can pass via the switch 24 after amplification in the amplifier 26 to the coupling coil 32. By this carrier wave the resonant circuit comprising the coil 38 and the capacitor 40 is stimulated to oscillate. The switches 42 and 46 are closed in this phase of the operating cycle. The coil 38 acts as transmitting coil which transmits the RF carrier wave as RF interrogation pulse for a duration defined by the duration of the signal at the output 22 of the microprocessor 18. After expiry of this duration defined by the microprocessor 18 operation of the RF generator 20 ends (instant $t_3$) To ensure that the oscillation in the resonant circuit formed by the coil 38 and the capacitor 40 dies away aperiodically as quickly as possible the switch 42 is briefly opened by a signal from the output 48 of the microprocessor 18 (period B) so that the resistor 44 acts as damping resistance for the resonant circuit. After again closing the switch 42 the switch 46 is opened (instant $t_4$) and as a result the resonant circuit comprising the coil 38 and the capacitor 40 is switched over to a series resonant circuit and is ready to receive a reply from the responder unit 12. Simultaneously with the opening of the switch 46 the switch 78 is closed and applies the supply voltage from the battery 74 to the clock generator 58, the demodulator 62 and the two amplifiers 52 and 54. For the duration of the period C the interrogation unit 10 is now ready to receive signals back from the responder unit 12.

It will be assumed that within the range of the coil 38 transmitting the RF interrogation pulse a responder unit 12 is present. The coil 132 of the parallel resonant circuit 130 of the responder unit 12 then receives this RF interrogation pulse so that the resonant circuit 130 is stimulated to oscillate. By means of the rectifier diode 144 the RF oscillation at the portion 138a of the RF bus 138 is rectified and the capacitor 136 is charged with direct current. For the energy supply of the assemblies of the responder unit 12 thereafter only the energy stored in the capacitor 136 is used.

With the termination of the reception of the RF interrogation pulse (instant $t_3$) the RF level at the portion 138a of the RF bus 138 begins to drop. The RF threshold detector 142 detects this decrease and at its output 150 emits a signal of predetermined value as soon as the level drops below a predetermined level. The voltage at the capacitor 136 is monitored by the DC voltage threshold detector 148 which when a predetermined DC voltage value is reached also furnishes at its output 152 a signal having the predetermined value. As soon as the two threshold detectors emit the signal with the predetermined value the AND circuit 154 generates at its output the start signal. Said start signal effects the closing of the switch 156 so that thereupon the supply voltage terminals of the remaining assemblies designated by "+" in the responder unit 12 are supplied with a supply voltage, that is the voltage at the capacitor 136 kept constant by means of the Zener diode 146. The start signal from the AND circuit 154 also effects closing of the switch 140 so that the two portions 138a and 138b of the RF bus 138 are connected together. Furthermore, with the start signal the monoflop 184 is triggered and thereupon emits for the duration of its hold time an excitation pulse which renders the field-effect transistor 190 conductive. As a result, from the capacitor 136 a circuit to ground is closed via the coil 132 and the RF bus 138. As a reaction thereto for the duration of the excitation pulse a direct current flows through the coil 132 and stimulates the parallel resonant circuit 130 to oscillate with its resonant frequency. The parallel resonant circuit 130 thus becomes an RF carrier wave generator.

After termination of the excitation pulse at the output of the monoflop 148 the field-effect transistor 190 is again rendered nonconductive so that no more current can flow through the coil 132. Since however the parallel resonant circuit 130 has a high quality the RF carrier oscillation does not cease immediately but the resonant circuit continues to oscillate with a damped oscillation. The divider 158 dividing the frequency of the RF carrier wave by two emits after the second oscillation period at its output a signal to the monoflop 192 which is thereby triggered and for the duration of its hold time applies a maintenance pulse to the field-effect transistor 190. As mentioned above the maintenance pulse furnished by the monoflop 192 is substantially shorter than the excitation pulse furnished by the monoflop 184. For the latter must start the RF carrier oscillation in the parallel resonant circuit 130 whilst the maintenance pulse of the monoflop 192 need only ensure that the oscillation already started is stimulated again, i.e. does not further decay. By the maintenance pulse from the monoflop 192, for the duration of the hold time a current flow is caused through the coil 132 and this means that for a short time energy is "pumped" into the RF carrier wave generator. This pumping effect occurs after every other oscillation period of the RF carrier wave, due to the use of the divider 158.

Directly after closure of the switch 140 the carrier wave from the parallel resonant circuit 130 also reaches the frequency multiplier 162 which doubles the carrier frequency. The signal doubled in frequency is shaped in the Schmitt trigger 164 so that at the output thereof a pulse-shaped signal is present which is applied to the memory 168 as clock signal. At the same time the pulses emitted by the Schmitt trigger 164 are counted in the counter 178.

It will be assumed that data are fixedly stored in the memory 168 and said data are uniquely assigned to the responder unit 12. Said data may for example consist of 64 bits. With the timing of the clock signals applied to the clock input 166 of the Schmitt trigger 164 the information present in the memory 168 is transferred to the shift register 172. For this transfer operation 64 pulses are required because then all the 64 data bits of the information are contained in the shift register 172. By also counting the clock pulses the counter 178 determines when the transfer of the data bits from the memory 168 to the shift register 172 is completed. After receiving 64 pulses it emits at its output 180 a switching signal to the changeover switch 174. The latter switch 174 has initially a switching position in which the clock input 176 of the shift register 172 receives like that of the memory 168 as clock pulses the output signals of the Schmitt trigger 164. By the switching signal the changeover switch 174 is actuated so that the clock input 176 of the shift register 172 receives the output signals of the divider 160 which divides the output signals of the divider 158 by four. The frequency of the signals now reaching the clock input 176 is thus one eighth of the frequency of the RF carrier wave of the parallel resonant circuit 130.

By supplying further clock pulses to the shift register 172 the information contained therein is emitted at the output 173 and supplied to the field-effect transistor 200. Depending on the binary value of the signal at the output 173 of the shift register 172 the field-effect transistor 200 is rendered conductive or nonconductive. In the conductive state of the field-effect transistor 200 the capacitor 198 is connected parallel to the parallel resonant circuit 130 so that the oscillation frequency thereof is governed by the sum of the capacitance values of the capacitor 134 and the capacitor 198. If however the field-effect transistor 200 is nonconductive the frequency with which the parallel resonant circuit 130 oscillates is governed solely by the capacitance of the capacitor 134. The switching on and off of the field-effect transistor 200 controlled in dependence upon the data from the shift register 172 thus effects a frequency shift keying of the oscillation frequency of the parallel resonant circuit 130 which leads to the well-known FSK modulation of the HF carrier wave generated.

The RF carrier wave is maintained by the pump action of the maintenance pulse from the monoflop 192 for as long as the energy stored in the capacitor 136 suffices to supply all the chips contained in the responder unit 12 with the energy necessary for satisfactory operation. As long as the RF carrier wave is present at the RF bus 138 the shift register 172 is supplied via the dividers 158 and 160 with clock pulses so that the information contained therein because of the presence of the feedback path 182 is furnished a number of times in succession at the output 173 and applied for FSK modulation to the field-effect transistor 200. The RF wave emitted by the coil 132 thus contains the modulated information from the memory 168 several times in succession.

As is apparent the clock frequency used for transmitting the information from the memory 168 to the shift register 172 is sixteen times higher than the frequency with which the information is emitted from the shift register. As a result the information from the memory 168 after stimulation of the RF carrier wave by means of the excitation pulse from the monoflop 184 is transferred very rapidly to the shift register 172 so that correspondingly it is also possible to begin very rapidly with the modulation of the RF carrier wave and thus with the return of the information contained in the memory 168 to the interrogation unit 10. Since the transmission energy continuously decreases with the decreasing voltage at the capacitor 164 a very rapid start of the sending back of the stored information is extremely desirable because then at least at the beginning a relatively high transmitting level is present which permits reliable identification of the information in the interrogation unit 10. The relatively high transmission level is moreover less prone to interference and this also contributes to identification reliability.

In a practically executed example the RF oscillator was operated with a frequency of 125 kHz so that accordingly the parallel resonant circuit 130 was also tuned to this frequency. When using this frequency it was possible to achieve that the entire 64 bits of the information stored in the memory 168 were sent back to the interrogation unit 10 within 5 ms. By means of a single RF interrogation pulse it was possible to effect return of the information fifteen times before the available energy in the responder unit 12 became too small for satisfactory operation.

The condition will now be considered where the responder unit 12 via the parallel resonant circuit 130 returns to the interrogation unit 10 information consisting of 64 bits. As already mentioned above the interrogation unit 10 after termination of the transmission of the RF interrogation pulse was set to the receiving state by opening the switch 46 and closing the switch 78. The modulated RF carrier signal received by the coil 38 is amplified in this state of the circuit in the amplifiers 52 and 54 and supplied to the clock generator 58 and the demodulator 62. The clock generator 58 generates from the RF signal received a clock signal for the microprocessor and the demodulator 62 demodulates the RF carrier signal subjected to the FSK modulation in the responder unit 12. The demodulated signal is supplied to the input 64 of the microprocessor 18 which thereupon supplies it via the connection 68 to the random access memory 66. At the same time the demodulated information can be visibly displayed to the operator in the display unit 72.

A possible case in practice is that within the time period in which the RF interrogation pulse is transmitted by the coil 38 no responder unit 12 is present within the range of the interrogation unit 10. In this case the interrogation unit 10 does not receive within a predetermined period after completion of the RF interrogation signal an answer and this causes the microprocessor 18 to restore the operating state present on transmission of the first interrogation pulse. However, in doing this instead of the switch 24 by a signal at the output 36 it closes the switch 28 (instant $t_5$) and as a result the RF oscillation generated by the RF oscillator 20 is supplied to the coil 38 via the amplifier 30 which has a higher gain than the amplifier 26. As a result transmission of the RF interrogation pulse is effected with higher power so that a greater range results. This increases the probability of a responder unit 12 being present within the range which will then respond and send back a response signal (period D).

The repeated transmission of an RF interrogation pulse with higher power can be used not only when after sending the first pulse no responder unit 12 has replied. For it would also be possible to effect this repeated transmission when a responder unit 12 has already answered. This would make it possible for a responder unit 12 disposed closer to the interrogation unit 10 to reply to the first RF interrogation signal whilst as reaction to the RF interrogation signal transmitted with higher power a responder unit 12 lying at a greater distance could reply. If this possibility is to be utilized however it must be ensured in the responder units that after receiving an RF interrogation pulse and executing a return transmission cycle for a certain period they are insensitive to the receipt of a further RF interrogation pulse. This makes it possible to prevent the same responder unit 12 replying to two consecutively transmitted RF interrogation pulses.

In practical use with the interrogation unit 10 in succession numerous objects each provided with a responder unit 12 are addressed by transmitting an RF interrogation pulse and the information returned by the responder units 12 is received by the interrogation unit 10 and stored in the random access memory 66. In the construction described in each case the responder units 12 which are within the transmitting range of the interrogation unit 10 are addressed. It may however also be desirable to address amongst a larger number of responder units 12 only quite specific individual units and cause them to return the information stored in them. This can be achieved by providing the processor 202 in the responder unit 12. Firstly, it must be ensured in the interrogation unit 10 that with the aid of the modulator 98 cooperating with the microprocessor 18 the RF interrogation pulse to be transmitted is modulated with the address which is provided for the responder unit 12 to be specifically activated. The responder unit 12 contains for this use the demodulator 212 which demodulates the RF interrogation pulse received. At the output 210 of the demodulator 212 the demodulated address is available and is applied to the input 208 of the processor 202. The processor then determines whether the address applied to it coincides with an address fixedly set in the responder unit 12. If the processor 202 detects such coincidence it furnishes at its output 206 a start signal which instead of the start signal furnished by the AND circuit 154 in the use previously described initiates the sending back to the interrogation unit 10 the information contained in the memory 168. In this manner, amongst a large number of objects provided with responder units 12 it is possible to specifically search for and find those with specific addresses.

In the examples of embodiment hitherto described the responder unit 12 always returned the information previously entered into the memory 168. It may however also be desirable by transmitting an RF interrogation pulse to request the responder unit 12 to send back specific data giving information on physical parameters in the environment of the responder unit 12. For example, in this manner the ambient temperature or the ambient pressure at the location at which the responder unit 12 is disposed can be requested. To make this possible at the responder unit 12 the sensor 204 may be disposed which is sensitive to the particular parameters of interest. The sensor 204 then passes its output signal to the processor 202 which from the sensor output signal generates data values which it supplies at the output 206 to the memory 168 which in this example of embodiment is a random access memory and not as before a read-only memory. The data which have been entered into said random access memory are then utilized in the manner described above via the shift register 172 for controlling the field-effect transistor 200 for modulation of the RF carrier wave to be sent back.

The sensor 204 could for example be an air-pressure-sensitive sensor. In this case the responder unit 12 can be installed in the carcass of a vehicle pneumatic tire and with the aid of an interrogation unit 10 contained in the vehicle it is possible to continuously monitor the air pressure obtaining in the tire.

After carrying out a relatively large number of interrogation cycles with the aid of the responder unit 10 in practical use in the random access memory 66 information is stored which has been returned from a relatively large number of responder units 12. For evaluation as a rule this information must then be transferred to a central data processing unit. It will now be described how this is done.

In the simplest case the data are taken off from the random access memory 66 at the jack 70 which is indicated as representative of a multipole connection in FIG. 1. Via said jack 70 the information contained in the memory 66 may be read in a manner with which the expert is familiar.

In the interrogation unit 10 illustrated in FIG. 1 the information from the random access memory 66 may however also be transmitted contactless to the base unit and from the latter transferred to a central data processing unit. The interrogation unit 10 is first placed on the base unit 16 so that the coil 96 comes to lie spatially close to the coil 118 in the base unit 16. As already mentioned above, on placing the responder unit 10 on the base unit 16 the switch 114 is also closed (instant $t_9$) so that charging of the battery 74 is ensured. Utilizing the signal furnished by the charge sensor 86 the microprocessor 18 is informed that the interrogation unit 10 is on the base unit 16. When the operator now closes the switch 76 and briefly depresses the key 14 the microprocessor 18 initiates an information transfer cycle in the course of which the content of the random access memory is transferred to the base unit 16 and from the latter via the output 214 to a central data processing unit. For initiating the data transfer process the microprocessor closes the switches 100 and 90 (instant $t_{10}$) and ensures that the oscillator 20 generates RF carrier oscillations. The information from the random access memory 66 is supplied via the switch 100 to the modulator 98 which modulates the RF carrier wave which the RF oscillator 20 generates. Via the switch 90 and the amplifier 94 the modulated RF carrier wave reaches the coil 96 from which it is coupled to the coil 118. The demodulator 120 demodulates the RF carrier wave so that at the output 214 the information taken from the random access memory 66 is available for further transfer to the central data processing unit.

In FIG. 1 in dashed line an alternative to transmitting the data from the memory 66 to a data processing unit is indicated. When using this alternative the modulator 98 in the interrogation unit 10 and the demodulator in the base unit 16 are not required because the information transfer is not in the form of modulation of an RF carrier wave but directly, i.e. using low-frequency signals employing the coils 104 and 118.

It has been shown that in the responder unit 12 the energy contained in the received RF carrier wave is stored and utilized for supplying assemblies necessary for the transmitting back of the stored data. The clock signals necessary for the control and synchronization are derived from the RF carrier wave which is generated immediately after termination of the RF interrogation pulse in the responder unit 12. Due to the derivation of the clock signal from the RF carrier wave signal a very good synchronization is achieved between the transmitter side and receiving side. The arrangement is not sensitive to frequency changes and calibration is therefore not necessary. Since the return of the data can be made very quickly a small capacitor can be used for the energy storing and this is a considerable contribution to reducing costs.

Figure 4:
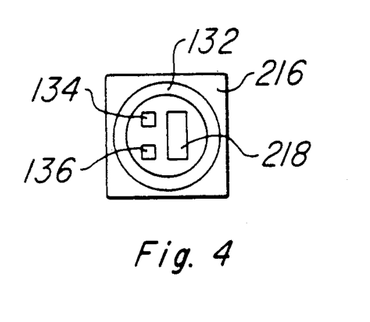
FIG. 4 is a first possible embodiment of the responder unit and FIG. 5 is a second possible embodiment of the responder unit.

The responder unit 12 described can be made almost completely as integrated circuit so that it can be produced with very small dimensions. Only the coil 132, the capacitor 134 and the capacitor 136 need be provided as individual components outside the integrated circuit. FIG. 4 shows how the individual components can be arranged on a support plate. The integrated circuit 218 and the capacitors 134, 136 are surrounded by the coil 132 which is made annular. A responder unit 12 with this construction could for example be disposed in each individual spare part of a large store of spare parts from which individual spares are automatically picked when required. Using an interrogation unit 10 the spares could be specifically sought in the store and then automatically removed.

Figure 5:
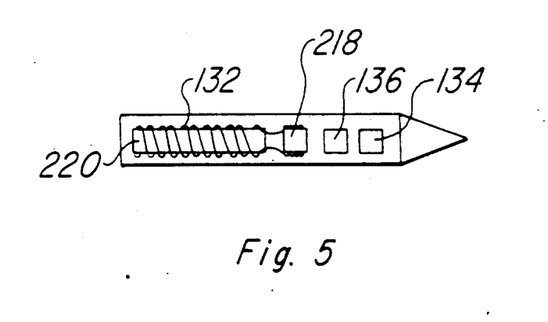

As already mentioned at the beginning the responder 12 can for example also be attached to animals in a large herd and employing the interrogation unit 10 the animals can be continuously supervised and checked. Since the components of the responder unit 12 can be made very small it is even possible to make the entire unit in the form of a small pin which can be implanted under the skin of the animal. A corresponding construction is shown in FIG. 5. The coil in this example could be wound round a small ferrite core 220 which increases the sensitivity.

We claim:

1. A transponder system comprising:
   an interrogation unit for communicating with cooperating responder units comprising;
   a microprocessor,
   a transmitter for transmission of at least one RF interrogation signal of a first frequency having a duration predetermined by the microprocessor, and
   a receiver for receiving signal information at the termination of the interrogation signal; and
   a responder unit located in spaced relation with respect to said interrogation unit for receiving on a resonant circuit said at least one interrogation signal transmitted form the transmitter of said interrogation unit and returning data as signal information on said resonant circuit to the receiver of said interrogation unit in response to the reception of said at least one interrogation signal, said responder unit comprising;
   an energy accumulator for storing the energy contained in said at least one interrogation signal as received by said responder unit,
   a carrier wave generator operable for providing a FSK modulated carrier wave having at least two frequencies, one of said two frequencies being said first frequency contained in said at least one interrogation signal and a second frequency selectively shifted from said first frequency,
   circuitry operably connected to the output of said carrier wave generator for producing control signals for maintaining and modulating the carrier wave,
   circuitry for transmitting the FSK modulated carrier wave and data from said responder unit back to the receiver of said interrogation unit as signal information, and
   circuitry for initiating operation of said carrier wave generator in response to the detected power level of the RF interrogation signal decreasing and the presence of a predetermined energy amount stored in said energy accumulator.

2. A transponder system as set forth in claim 1, wherein said circuitry for initiating operation of said carrier wave generator comprises;
   an RF threshold detector,
   a DC voltage threshold detector, and
   a triggering circuit to which said RF threshold detector and said DC voltage threshold detector are connected for generating a start signal for initiating said operation of said carrier wave generator whenever the level of the interrogation signal received by the responder unit means drops below a predetermined value and a DC voltage of predetermined value is present at the output of said energy accumulator.

3. A transponder system as set forth in claim 2, wherein said carrier wave generator includes a parallel resonant circuit for receiving the interrogation pulse, said parallel resonant circuit having a coil and a capacitor and being responsive to the start signal initiating the flow of a direct current through the coil of said parallel resonant circuit to provide the carrier wave for a predetermined duration.

4. A transponder system as set forth in claim 3, wherein said circuitry for initiating operation comprises a first monostable flip-flop circuit responsive to the start signal generated by the triggering circuit and which provides an excitation pulse having a duration determining the duration of the current flow through the coil of said parallel resonant circuit.

5. A transponder system as set forth in claim 4, wherein said circuitry for producing the control signal is effective to produce said control signal in response to each occasion of a predetermined number of carrier waves provided by said carrier wave generator, said control signal initiating the application of a maintenance pulse of predetermined duration to said carrier wave generator.

6. A transponder system as set forth in claim 5, further including a second monostable flip-flop circuit responsive to said control signal for furnishing said maintenance pulse providing a direct current for the duration thereof flowing through the coil of said parallel resonant circuit.

7. A transponder system as set forth in claim 1, further including memory circuitry in which the data to be returned by said responder unit to said interrogation unit is stored,
   a modulator device connected to said memory circuitry and to said carrier wave generator, and
   said memory circuitry being responsive to said control signal for supplying the data stored therein to said modulator device for modulation of said carrier wave.

8. A transponder system as set forth in claim 7, further including a shift register connected between said memory circuitry and said modulator device,
   divider circuit for receiving the control signal and generating therefrom a clock signal at a lower recurring frequency,
   a counter operably connected to said memory circuitry for counting the clock pulses, derived from said carrier wave, applied to said memory circuitry,
   said memory circuitry providing data to said modulator device via said shift register into which said memory circuitry introduces the data stored therein in timed sequence under control of the carrier wave clock signal, and
   a counter incrementing in response to each of the carrier wave clock pulses applied to said memory circuitry and being responsive to a predetermined number of pulses indicative of the entry of all the data from said memory circuitry into said shift register to apply the clock signal generated by said divider circuit to said shift register instead of the clock signal derived from the carrier wave.

9. A transponder system as set forth in claim 8, wherein said shift register is provided with a feedback line from its output to its input to enable the data supplied thereto to be circulated therewithin as long as clock signals are applied thereto, and said shift register being effective to provide the data contained therein from its output to said modulator device as long as said carrier wave generator provides carrier waves.

10. A transponder system as set forth in claim 9, wherein said modulator device is so constructed to vary the frequency of the carrier wave in dependence upon the data supplied to it from said memory circuitry.

11. A transponder system as set forth in claim 10, wherein said modulator device comprises a capacitor, and switching circuitry connected to said capacitor and being disposed in closed or open positions depending upon whether the data is operatively connected or disconnected with respect to said carrier wave generator.

12. A transponder system as set forth in claim 7, wherein said memory circuitry is a programmable read-only-memory.

13. A transponder system as set forth in claim 7, wherein said memory circuitry is a random access memory.

14. A transponder system as set forth in claim 13, wherein said responder unit further includes a data processor operably connected to said random access memory for generating the data to be sent back to said interrogation unit and entering said data in said random access memory.

15. A transponder system as set forth in claim 14, further including sensor circuitry sensitive to predetermined physical parameters in the environmental area of said responder unit and operably connected to said data processor, said data processor being responsive to output signals from said sensor circuitry in generating the data to be entered into said random access memory.

16. A transponder system as set forth in claim 14, wherein at least one interrogation signal transmitted by the transmitter of said interrogation unit is modulated to include a specific address of one or more of a plurality of said responder unit to enable only selected responder unit having an address corresponding to the address included in said interrogation signal to react to the reception of said interrogation signal with the return of a modulated carrier wave having data provided therein to said interrogation unit, said responder unit further including demodulator circuit for receiving said at least one interrogation signal from said interrogation unit and determining the address provided therein;

said data processor enabling said responder unit to send back the store data to said interrogation unit in response to a comparison between the address as determined by said demodulator circuit with the address stored in said responder unit establishing identity of the compared addresses.

17. A transponder system as set forth in claim 1, wherein the transmitter of said interrogation unit after transmitting a first interrogation signal is effective to transmit a further interrogation signal with higher transmission power after a predetermined time interval from the transmission of said first interrogation signal.

18. A transponder as set forth in claim 1, wherein the receiver of said interrogation unit includes a random access memory for receiving data sent back by said responder unit.

19. A transponder system as set forth in claim 18, wherein said interrogation unit further includes circuitry operably connected to said random access memory included in the receiver thereof for enabling transmission of data contained in said random access memory to a central data processing unit.

20. A transponder system as set forth in claim 1, wherein said responder unit further includes circuitry for sending the stored data in the form of said FSK modulated carrier a multiplicity of times in response to a single interrogation signal.

21. A transponder system as set forth in claim 7, wherein the data stored in said memory circuitry uniquely identifies each transponder.

* * * * *